United States Patent [19] [11] 3,836,214
Gengard et al. [45] Sept. 17, 1974

[54] SPIRAL GROOVE BEARINGS
[75] Inventors: Sven-Erik Olof Gengard, Partille; Yngve Lennart Johansson, Goteborg, both of Sweden
[73] Assignee: SKF Industrial Trading and Development Company, B.V., Amsterdam, Netherlands
[22] Filed: May 22, 1973
[21] Appl. No.: 362,864

[30] Foreign Application Priority Data
May 23, 1972 Sweden .............................. 6657/72

[52] U.S. Cl. ............................................... 308/159
[51] Int. Cl. ............................................ F16c 17/06
[58] Field of Search ............. 308/159, 230, 72, 165, 308/166

[56] References Cited
UNITED STATES PATENTS
1,873,086  8/1932  Watts .................................. 308/72
1,883,882  10/1932  Davis .................................. 308/72
2,938,755  5/1960  Lee ..................................... 308/72
FOREIGN PATENTS OR APPLICATIONS
560,419  10/1955  Italy .................................... 308/72

Primary Examiner—Manuel A. Antonakas
Assistant Examiner—Frank Susko
Attorney, Agent, or Firm—Howson and Howson

[57] ABSTRACT

A spiral groove bearing assembly comprising a first bearing member having a convex bearing surface, a second bearing member having a concave bearing surface defining a bearing seat for said first member, means defining a shallow groove pattern in one of said bearing surfaces, said second bearing member being formed of a relatively thin walled disc shaped element to an inverted cuplike form including a center portion defining the concave bearing surface and a depending generally cylindrical skirt portion integral with the central portion and merging therewith in a rounded circumferentially extending edge, said seat conforming closely to the contour of said first convex bearing surface to permit a wide angle of contact between said first and second bearing surfaces, the lower edge of said skirt portion adapted to be secured in a bearing support member.

5 Claims, 1 Drawing Figure

PATENTED SEP 17 1974  3,836,214
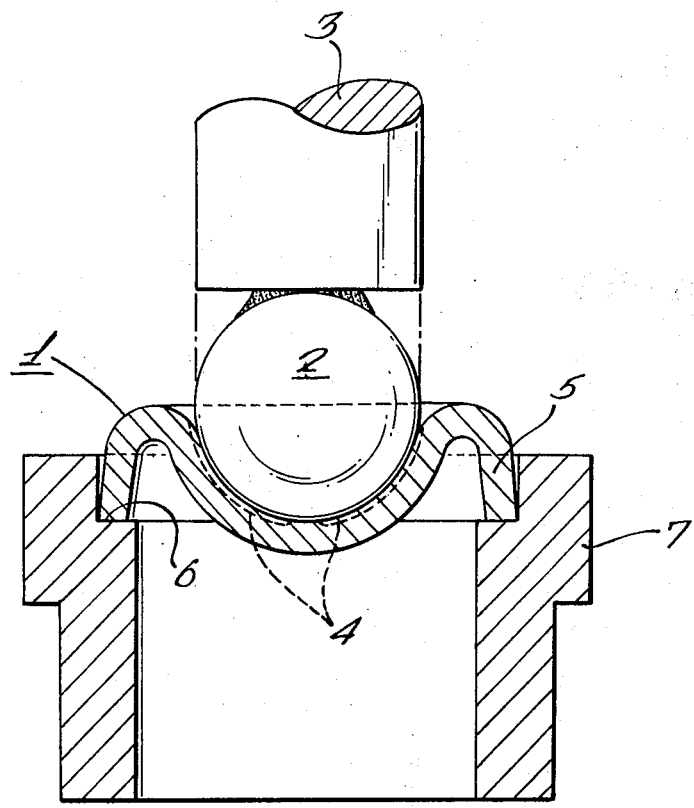

SPIRAL GROOVE BEARINGS

The present invention relates to a spiral groove bearing comprising a member which makes it possible for the bearing to carry axial or axial/radial load.

Bearings of this type are earlier known and consist of one concave member with preferably spherical contact surface and one in a corresponding manner shaped convex member. The concave member is shaped as a relatively thin-walled body. It has, however, appeared that the known bearing shell is marred by certain failings, since it during manufacturing gets a shape which does not make it accurate and rigid and the encircling angle of the co-operating bearing member is too small. This does not make the bearing good in working.

The new step in the invention is that the bearing shell during manufacturing obtains a stiffness by turning the upper edge of the bearing shell so that a cylindrical or some conical collar is shaped at this place.

The invention will now be described more in detail with reference to the accompanying drawing, in which a spherical spiral groove bearing in accordance with the invention is shown.

The spiral groove bearing consists of a concave bearing shell 1 and a convex bearing member 2, here shown as a ball which might be fixed to an axle journal 3. When the bearing rotates, a medium in the form of for instance grease or oil is pumped between the bearing members in shallow grooves 4 therein. The bearing shell is shaped with a collar portion 5 which rests in a recess 6 in a bearing holder 7.

When manufacturing the bearing shell in a suitable manner it is possible to obtain a bearing shell which fulfills the criteria requested of a good working bearing shell in this type of bearing, viz, perfect form and stability of form and a great encircling angle of the co-operating bearing member, up to 180° which is ideal for operating a spiral groove bearing of this type perfectly. Furthermore, that advantage is obtained that by means of the collar portion 5 with it some conical shape the bearing shell will be fixed in the recess of the holder 7 in a simple and reliable manner. Thus, it is not necessary to perform any special operations for the fixing or to use any special fixing means.

The invention is not tied to the above described embodiment but could be varied in a number of ways within the scope of the following claim. It could be possible for instance instead of the spherical contact surface of the bearing shell to make this conical and it is also possible to make the bearing shell with a central bore for a through shaft.

We claim:

1. A spiral groove bearing assembly comprising a first bearing member having a convex bearing surface, a second bearing member having a concave bearing surface defining a bearing seat for said first member, means defining a shallow groove pattern in one of said bearing surfaces, said second bearing member being formed of a relatively thin walled disc shaped element to an inverted cup-like form including a center portion defining the concave bearing surface and a depending generally cylindrical skirt portion integral with the central portion and merging therewith in a rounded circumferentially extending edge, said seat conforming closely to the contour of said first convex bearing surface to permit a wide angle of contact between said first and second bearing surfaces, the lower edge of said skirt portion adapted to be secured in a bearing support member.

2. A bearing assembly as claimed in claim 1 wherein said groove pattern is formed in said concave bearing surface.

3. A bearing assembly as claimed in claim 1 wherein said groove pattern is a spiral groove pattern having a center coinciding with the bearing axis.

4. A bearing assembly as claimed in claim 1 wherein said first bearing member is a ball and said second bearing surface is of a configuration and depth to provide an encircling angle of approximately 180°.

5. A bearing assembly as claimed in claim 1 wherein said skirt is of conical shape and flares slightly outwardly toward its lower edge.

* * * * *